US012650510B2

(12) United States Patent (10) Patent No.: US 12,650,510 B2
Zhang et al. (45) Date of Patent: Jun. 9, 2026

(54) RADAR LAYOUT METHOD APPLIED TO BIRD INVASION DETECTION

(71) Applicant: Guangdong University of Technology, Guangzhou (CN)

(72) Inventors: Bin Zhang, Guangzhou (CN); Xinyu Ran, Guangzhou (CN); Wei Meng, Guangzhou (CN); Mali Xing, Guangzhou (CN); Renquan Lu, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 199 days.

(21) Appl. No.: 18/750,661

(22) Filed: Jun. 21, 2024

(65) Prior Publication Data

US 2025/0172689 A1 May 29, 2025

(30) Foreign Application Priority Data

Nov. 23, 2023 (CN) .......................... 202311574115.7

(51) Int. Cl.
G01S 13/88 (2006.01)
(52) U.S. Cl.
CPC .................................. G01S 13/88 (2013.01)
(58) Field of Classification Search
CPC ...... G01S 13/006; G01S 13/88; G01S 13/886;
G01S 13/951; Y02T 10/40; G06N 3/126
See application file for complete search history.

(56) References Cited

U.S. PATENT DOCUMENTS

| | | | |
|---|---|---|---|
| 10,191,150 B2 * | 1/2019 | Moreira Neto | ......... G01S 13/66 |
| 10,316,823 B2 * | 6/2019 | Bacquie | ............. G05B 23/0289 |
| 10,534,070 B2 * | 1/2020 | Hamminga | ............. G01S 19/03 |
| 11,080,974 B2 * | 8/2021 | Pantus | .................... G01S 13/56 |
| 11,333,739 B2 * | 5/2022 | Wodrich | ............... G01S 13/878 |
| 11,441,543 B2 * | 9/2022 | Przybycin | ............... F03D 17/00 |
| 2013/0314273 A1 * | 11/2013 | Kavaler | ................. G08G 1/015 |
| | | | 342/90 |

(Continued)

FOREIGN PATENT DOCUMENTS

| | | |
|---|---|---|
| CN | 113076860 A | 7/2021 |
| CN | 117131998 A | 11/2023 |
| CN | 117292242 A | 12/2023 |

*Primary Examiner* — Peter M Bythrow
(74) *Attorney, Agent, or Firm* — Nitin Kaushik

(57) ABSTRACT

The present disclosure provides a radar layout method applied to bird invasion detection, including the following steps: dividing an environment to be laid out into regions, acquiring environment parameters of each region, and setting radar layout parameters of each region; determining a key region of bird invasion by means of calculation according to the environment parameters of each region, and determining a radar layout evaluation value for each region by means of calculation according to the radar layout parameters of each region; determining, based on the key region of bird invasion and the radar layout evaluation value for each region, a radar layout region to be optimized; and determining a fitness function of a genetic algorithm based on the radar layout parameters of the radar layout region to be optimized, and performing genetic algorithm iteration by using the fitness function until a preset optimization condition is reached.

10 Claims, 4 Drawing Sheets

(56)  References Cited

U.S. PATENT DOCUMENTS

| | | | | |
|---|---|---|---|---|
| 2015/0204973 A1* | 7/2015 | Nohara | .................. | G01S 7/003 |
| | | | | 342/107 |
| 2016/0025849 A1* | 1/2016 | Wang | ................ | G01S 13/5244 |
| | | | | 342/59 |
| 2017/0276770 A1* | 9/2017 | Lin | .......................... | H01Q 3/24 |
| 2019/0137604 A1* | 5/2019 | Fails | .................... | G01S 13/582 |
| 2022/0130109 A1* | 4/2022 | Arbabian | .............. | G08B 23/00 |
| 2023/0417906 A1* | 12/2023 | Gatz | ...................... | G06N 3/126 |
| 2024/0176005 A1* | 5/2024 | Yan | ....................... | G01S 13/325 |
| 2024/0410977 A1* | 12/2024 | Yatabe | .................. | G01S 13/60 |

* cited by examiner

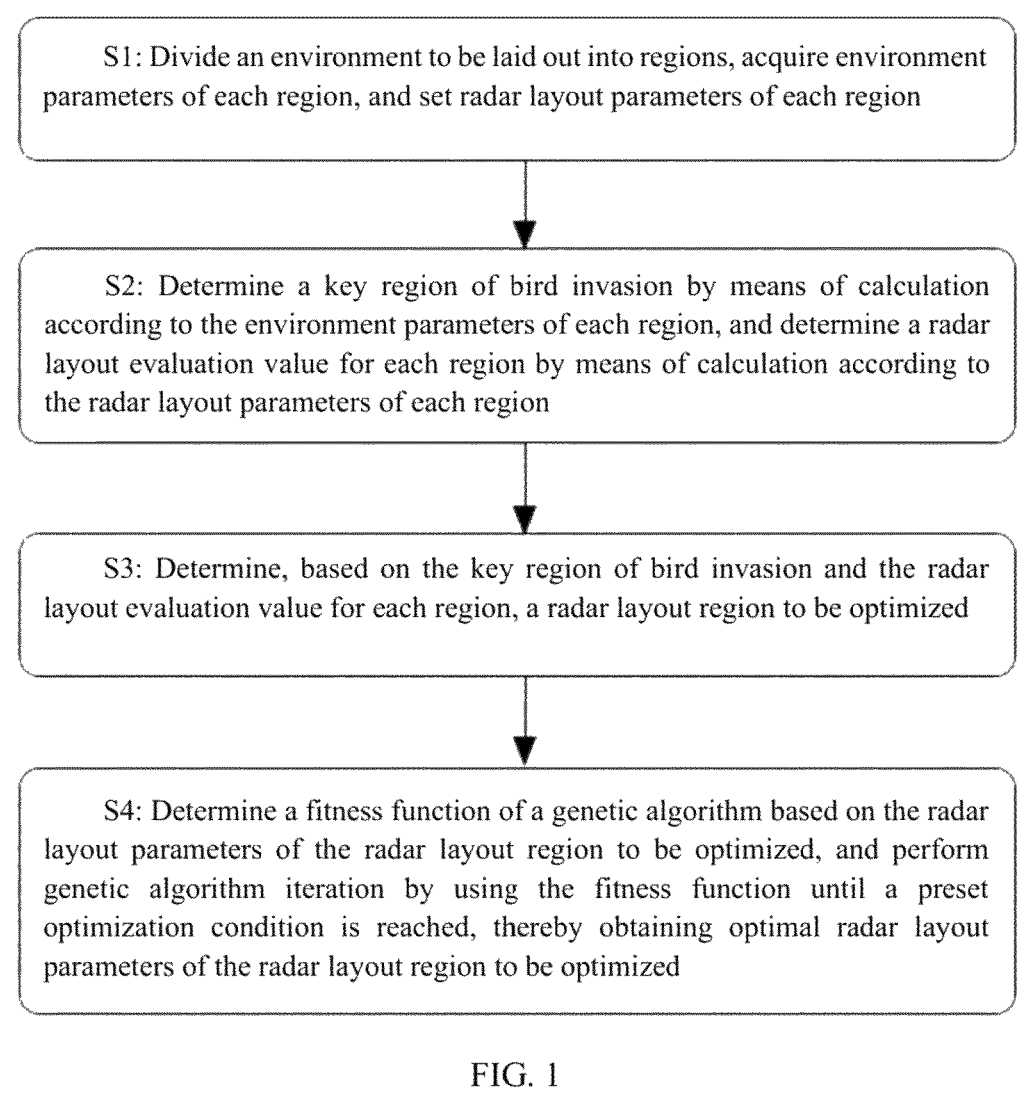

S1: Divide an environment to be laid out into regions, acquire environment parameters of each region, and set radar layout parameters of each region S2: Determine a key region of bird invasion by means of calculation according to the environment parameters of each region, and determine a radar layout evaluation value for each region by means of calculation according to the radar layout parameters of each region S3: Determine, based on the key region of bird invasion and the radar layout evaluation value for each region, a radar layout region to be optimized S4: Determine a fitness function of a genetic algorithm based on the radar layout parameters of the radar layout region to be optimized, and perform genetic algorithm iteration by using the fitness function until a preset optimization condition is reached, thereby obtaining optimal radar layout parameters of the radar layout region to be optimized

FIG. 1

RADAR LAYOUT METHOD APPLIED TO BIRD INVASION DETECTION

CROSS-REFERENCE TO RELATED APPLICATIONS

The application claims priority to Chinese patent application No. 2023115741157, filed on Nov. 23, 2023, the entire contents of which are incorporated herein by reference.

TECHNICAL FIELD

The present disclosure relates to the technical field of optimized radar layout, and in particular, to a radar layout method applied to bird invasion detection.

BACKGROUND

At present, with the changes of climates, the increase of the reproduction rate and population of species, and the impact of human activities, large-scale migration and spread of bird populations have appeared, resulting in the invasion of some alien species into new regions. These birds may lead to the destruction of ecosystems, interference with human activities, destruction of crops, etc. Therefore, in order to avoid destructions caused by bird invasion and unnecessary impacts, it is increasingly important to monitor bird invasion efficiently and cost-effectively.

In order to effectively respond to bird invasion, bird invasion is monitored and managed in many areas through various technical means. With the rapid development of network information technologies, bird invasion detection is becoming more and more intelligent. Using a perfect video monitoring system and image recognition technology for remote monitoring to capture in real time and rapidly identify bird signs greatly improves the efficiency of bird invasion detection. However, due to the small size of birds and the susceptibility of the video monitoring system to environment factors, images captured by video monitoring cameras are often difficult to be accurately identified. Therefore, radars are introduced to detect birds, but the existing radar layout will have the problems of insufficient coverage and repeated layout, which makes the detection of the radars on bird invasion ineffective and inaccurate.

Therefore, it is of great value to study a reliable and efficient radar layout method for bird invasion detection.

SUMMARY

An object of the present disclosure is to provide a radar layout method applied to bird invasion detection, so as to solve the problems of low efficiency and inaccuracy of radars in bird invasion detection since the existing radar layout for bird invasion detection undergoes insufficient coverage and repeated layout.

In order to solve the above technical problems, the present disclosure provides a radar layout method applied to bird invasion detection, including the following steps:

S1, dividing an environment to be laid out into regions, acquiring environment parameters of each region, and setting radar layout parameters of each region;

S2, determining a key region of bird invasion by means of calculation according to the environment parameters of each region, and determining a radar layout evaluation value for each region by means of calculation according to the radar layout parameters of each region;

S3, determining, based on the key region of bird invasion and the radar layout evaluation value for each region, a radar layout region to be optimized; and S4, determining a fitness function of a genetic algorithm based on the radar layout parameters of the radar layout region to be optimized, and performing genetic algorithm iteration by using the fitness function until a preset optimization condition is reached, thereby obtaining optimal radar layout parameters of the radar layout region to be optimized.

In an embodiment, the step S4 specifically includes the following steps: S41, determining the fitness function based on the radar layout parameters of the radar layout region to be optimized; S42, partitioning the radar layout region to be optimized to obtain a plurality of partitions to be optimized; S43, calculating, by using the fitness function, fitness values of all radars in each partition to be optimized, and selecting two radar points with the smallest fitness values in each partition to be optimized as parents of the partition to be optimized; S44, setting a probability value, cross-matching, with the set probability, parent radar points of each partition to be optimized to obtain new child radar points, calculating their fitness values, and replacing the radar point having a lower fitness value with a radar point having a higher fitness value; S45, calculating, by using the fitness function, an overall fitness value of each of the partitions to be optimized and a total fitness value of the radar layout region to be optimized; and S46, cycling S41 to S45 until the overall fitness value of each of the partitions to be optimized and the total fitness value of the radar layout region to be optimized reach the highest, thereby obtaining optimal radar layout parameters of the radar layout region to be optimized.

In an embodiment, the step S41 specifically includes the following steps: S410, calculating a coincidence degree of radar detection, a signal-to-noise ratio of each radar and comprehensive cost based on the radar layout parameters of the radar layout region to be optimized; and S411, determining the fitness function of the genetic algorithm according to the coincidence degree of radar detection, the signal-to-noise ratio of each radar and the comprehensive cost.

In an embodiment, the fitness function is:

$$\max G(R, S, C) = \omega_1(-g_1(R)) + \omega_2 g_2(S) + \omega_3(-g_3(C))$$

$$g_1(R) = \frac{s'_{ij}}{s_{ij}}$$

$$g_2(S) = 10\log_{10}\frac{P_s}{P_n}$$

$$g_3(C) = nc_1 + c_2$$

where $g_1(R)$, $g_2(S)$ and $g_3(C)$ are calculation functions for the coincidence degree of radar detection ranges, the signal-to-noise ratio of each radar and the comprehensive cost, respectively; $\omega_1$ is a weight of the coincidence degree of radar detection; $\omega_2$ is a weight of the signal-to-noise ratio of each radar; $\omega_3$ is a weight of the comprehensive cost; $S'_{ij}$ is the area of a detection range where the j-th radar in the ith region overlaps with other radars; $S_{ij}$ is a detection range of the j-th radar in the ith region; $P_s$ is a received signal power; $P_n$ is a background noise power; n is the total number of laid-out radars; $c_1$ is the cost of a single radar; and $c_2$ is the cost of others, including the cost of human resources.

In an embodiment, the step S44 of cross-matching the parent radar points with the set probability to obtain new child radar points includes: exchanging and selecting position information of the parent radar points to obtain child radar points through a multi-point intersection operation with the parent radar point coverage and the corresponding directions.

In an embodiment, the step S45 further includes the following step: optimizing, by using a simulated annealing algorithm, radar layout of each partition to be optimized.

In an embodiment, the step of optimizing, by using a simulated annealing algorithm, radar layout of each partition to be optimized specifically includes the following steps: selecting a radar point with the lowest fitness function value in the partitions to be optimized, and then moving the position of the radar randomly; and calculating an overall fitness value of the moved partitions to be optimized, determining a receiving probability according to a receiving probability selection function, and receiving a new radar layout with the receiving probability.

In an embodiment, the calculation formula of the receiving probability selection function is:

$$P_i = \max\left(1, \exp\left(-\frac{F_2 - F_1}{kT}\right)\right)$$

where $P_i$ is the receiving probability; $F_1$ and $F_2$ represent overall fitness values of this region before and after the movement of the radar, respectively; k represents a Boltzmann constant; and T is a control parameter.

In an embodiment, the step S2 includes the following steps: S20, weighting influencing factors that make each region vulnerable to bird invasion to determine a key region of bird invasion; and S21, calculating a radar layout evaluation value for each region based on the radar layout parameters of each region and a ratio of an actual detection range to a theoretical detection range of the radars, where the influencing factors that make each region vulnerable to bird invasion include a bird distribution range, suitability of an environment, transport means and a known invasion region.

In an embodiment, the step S1 includes the following steps: dividing the environment into regions according to a rotating bounding box algorithm; and deploying radars at the vertices of a bounding box according to the shape of the bounding box and the maximum detection range of the radars, and deploying another radar every other vertex until the radar detection range has covered the entire regions.

The present disclosure has the following beneficial effects.

In this method, due to the introduction of a key region of bird invasion and a radar layout evaluation value as determining factors for the radar layout region to be optimized, the radar layout can be adjusted for the key region of bird invasion where an unreasonable radar layout exists at the same time, such that regions that need radar layout can be judged more accurately. In addition, the optimal radar layout of the regions is determined in combination with a genetic algorithm, which can achieve the optimal radar layout for bird invasion detection and avoid the cases of insufficient layout coverage and repeated layout, thereby improving the efficiency and accuracy of bird invasion detection.

BRIEF DESCRIPTION OF DRAWINGS

To illustrate the technical solutions of the present disclosure more clearly, a brief introduction regarding the accompanying drawings that need to be used in the embodiments is given below. It is obvious that the accompanying drawings in the following description are only some embodiments of the present disclosure, and those of ordinary skill in the art can also obtain other accompanying drawings according to these accompanying drawings without creative effort.

FIG. 1 is a schematic diagram of the overall process provided in a preferred embodiment of the present disclosure;

DETAILED DESCRIPTION OF THE EMBODIMENTS

Figure 2:
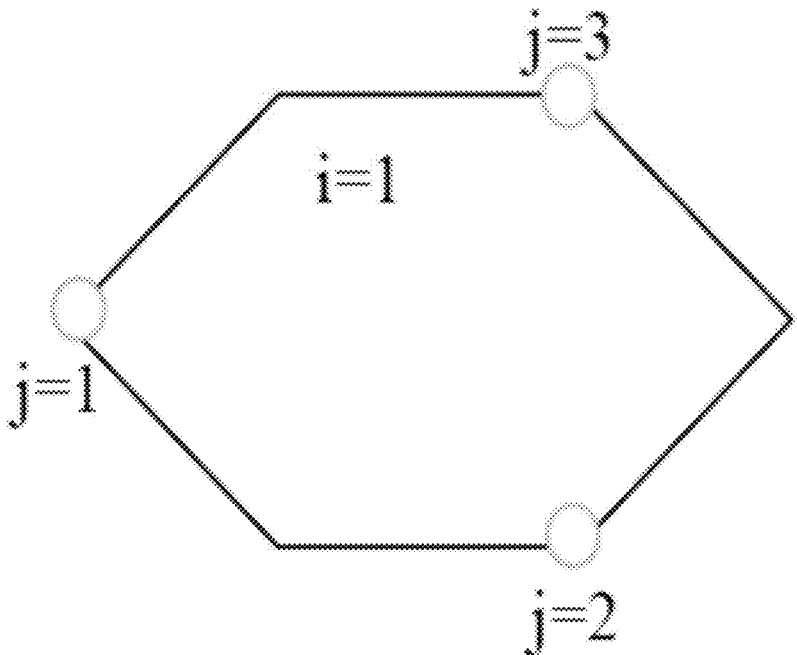
FIG. 2 is a schematic diagram of a rotating bounding box algorithm provided in a preferred embodiment of the present disclosure.

The technical solutions in the embodiments of the present disclosure will be described clearly and completely below in conjunction with accompanying drawings in the embodiments of the present disclosure.

In order to effectively respond to bird invasion, bird invasion is monitored and managed in many areas through various technical means. With the rapid development of network information technologies, bird invasion detection is becoming more and more intelligent. Using a perfect video monitoring system and image recognition technology for remote monitoring to capture in real time and rapidly identify bird signs greatly improves the efficiency of bird invasion detection. Due to the small size of birds and the susceptibility of the video monitoring system to environment factors, images captured by video monitoring cameras are often difficult to be accurately identified. Therefore, radars are introduced to detect birds, but the existing radar layout will have the problems of insufficient coverage and repeated layout, which makes the detection of the radars on bird invasion ineffective and inaccurate.

In order to solve the above technical problems, this solution provides a radar layout method applied to bird invasion detection. Referring to FIG. 1, the method includes the following steps S1 to S4.

In an embodiment of the present application, in S1, an environment to be laid out is divided into regions, environment parameters of each region are acquired, and radar layout parameters of each region are set.

Preferably, the step S1 includes the following step S11 to S12.

In S11, the environment is divided into regions according to a rotating bounding box algorithm to obtain divided regions, and a serial number is set for each divided region. The rotating bounding box algorithm may set the shape of a bounding box according to an actual environment, and thus has better adaptability, which can reflect a boundary and divide the entire environment region more accurately, and when dividing the regions and initializing the radar layout, is more conducive to calculating an overlapping area and a coverage range thereof, thereby improving the calculation efficiency. Therefore, after the rotating bounding box algorithm is adopted, the fine division of environment regions will be more accurate and reliable.

Specifically, the step S10 includes the following steps S110 to S113.

In S110, the shape of the bounding box is initialized.

In S111, vertices of the bounding box are aligned with vertices of an environment boundary, the bounding box is rotated, regions with the largest coverage area of the bounding box are determined, and the regions are numbered as (i=1, 2, . . . , n).

In S112, the vertices of the bounding box are aligned with vertices of the divided regions, the bounding box is rotated, and regions of the bounding box that have the smallest overlap area with the divided regions as new divided regions.

In S113, whether the new divided regions cover the initial regions is determined; if yes, region division is ended; and if not, S112 is executed until the initial regions are completely covered.

In S12, radars are deployed at the vertices of the bounding box according to the shape of the bounding box and the maximum detection range of the radars, and another radar is deployed every other vertex. This process is as shown in FIG. 2. The radars are numbered as (j=1, 2, . . . , m) until the radar detection range has covered the entire regions. The radars are sequentially numbered. The detection range of a Doppler radar is 2 m to 10 m, and the detection region is fan-shaped. After this setting mode is adopted, the initial layout of radars is completed for the radar layout of each region according to a set rule.

It should be pointed out that if the radar detection range has covered the entire regions, the initial layout of radars will be completed; and if the radar detection range does not cover the entire regions, radars will continue to be deployed at corresponding vertices to cover the whole regions.

In an embodiment of the present application, in S2, a key region of bird invasion is determined by means of calculation according to the environment parameters of each region, and a radar layout evaluation value for each region is determined by means of calculation according to the radar layout parameters of each region. After this setting mode is adopted, the key region of bird invasion and the radar layout evaluation value are introduced in this method as determining factors for a radar layout region to be optimized, and the radar layout can be adjusted for the key region of bird invasion where an unreasonable radar layout exists at the same time, such that regions that need radar layout can be judged more accurately.

Preferably, the step S2 includes the following steps S21 to S22.

In S2, influencing factors that make each region vulnerable to bird invasion are weighted to determine a key region of bird invasion, where the influencing factors that make each region vulnerable to bird invasion include a bird distribution range, suitability of an environment, transport means and a known invasion region.

Specifically, the step S21 includes the following steps S210 to S213.

In S210, weight coefficients $\beta_1$, $\beta_2$, $\beta_3$ and $\beta_4$ are set for the bird distribution range, the suitability of the environment, the transport means and the known invasion region according to the environment parameters of each region, where $\beta_1+\beta_2+\beta_3+\beta_4=1$.

In S211, an evaluation function for possible bird invasion in each region is constructed according to a formula:

$$f(i) = \sum_{j}^{4} \beta_n f_{ni}$$

where $f_{ni}$ represents four influencing factors near the ith corresponding region, i.e., the bird distribution range, the suitability of the environment, the transport means and the known invasion region.

In S212, an evaluation function value for the key region is set according to influencing factors of different environments, the evaluation function value for the key region being used as a criterion to determine the key region of bird invasion.

In this embodiment, preferably, if an evaluation value for the key region of bird invasion is set as 0.8, whether this region is the key region of bird invasion by calculating the evaluation value for each region, that is, whether it is necessary to focus on the radar layout, may be judged in order to monitor a bird invasion situation more accurately. Certainly, the evaluation value for the key region of bird invasion is set according to the selection of those skilled in the art.

In S213, the environment parameters of each region are substituted into a bird invasion evaluation function respectively, an evaluation function value for each region is calculated, whether the evaluation function value for each region is greater than the evaluation function value for the key region is judged, and if yes, this region is set as the key region of bird invasion.

In S22, a radar layout evaluation value for each region is calculated based on the radar layout parameters of each region and a ratio of an actual detection range to a theoretical detection range of the radars.

Specifically, the radar layout evaluation value is calculated by substituting the radar layout parameters of each region into a formula of the ratio of the actual detection range to the theoretical detection range, where the formula of the ratio of the actual detection range to the theoretical detection range is:

$$h(n, s) = \frac{S_n}{ns}$$

where n is the total number of radars deployed in regions; s is the theoretical maximum detection range of a radar; and Sn is an actual total detection range of radars.

Figure 3A:
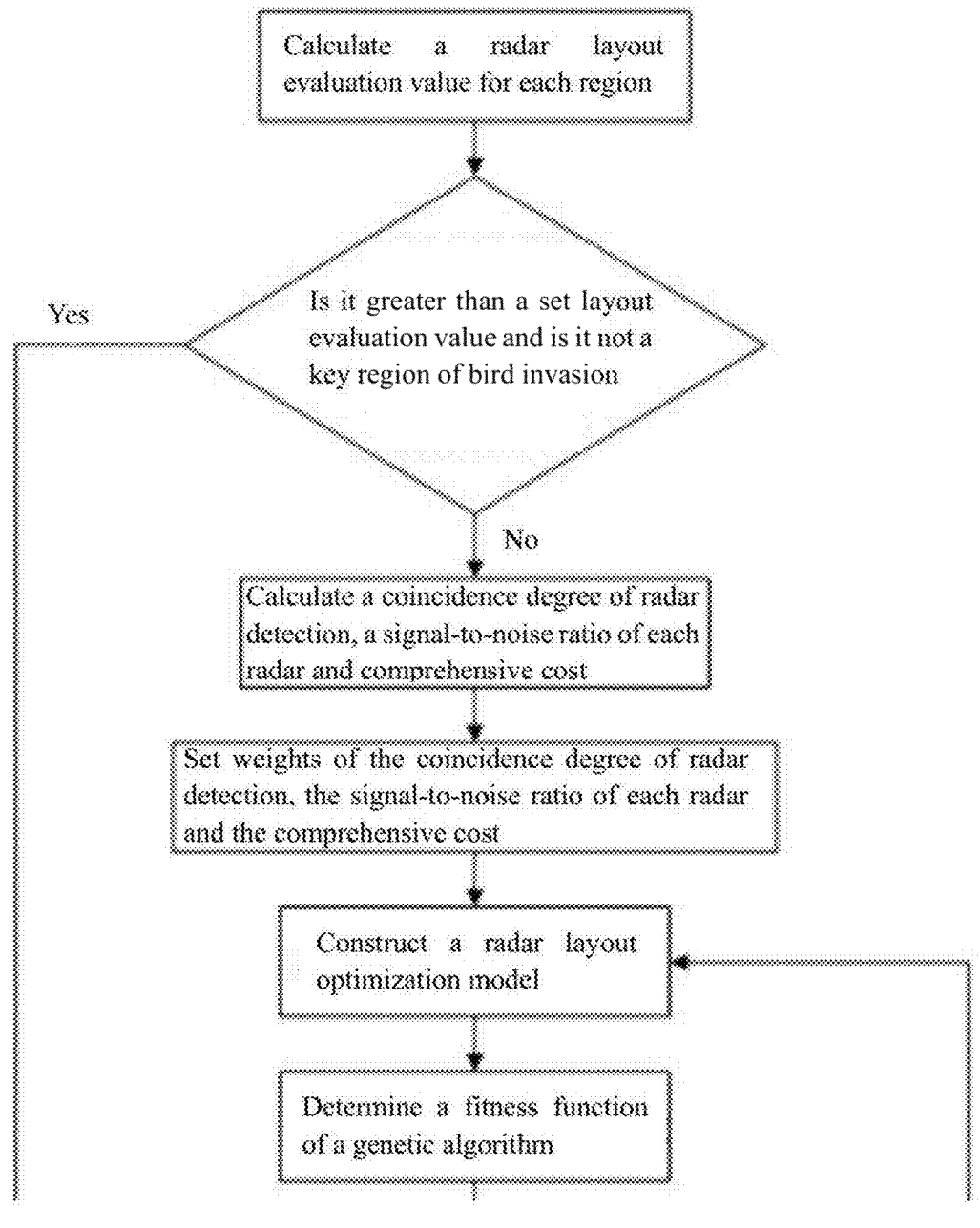
FIGS. 3A and 3B is a schematic diagram of the process of determining a region to be optimized and a genetic algorithm provided in a preferred embodiment of the present disclosure.
Figure 3B:
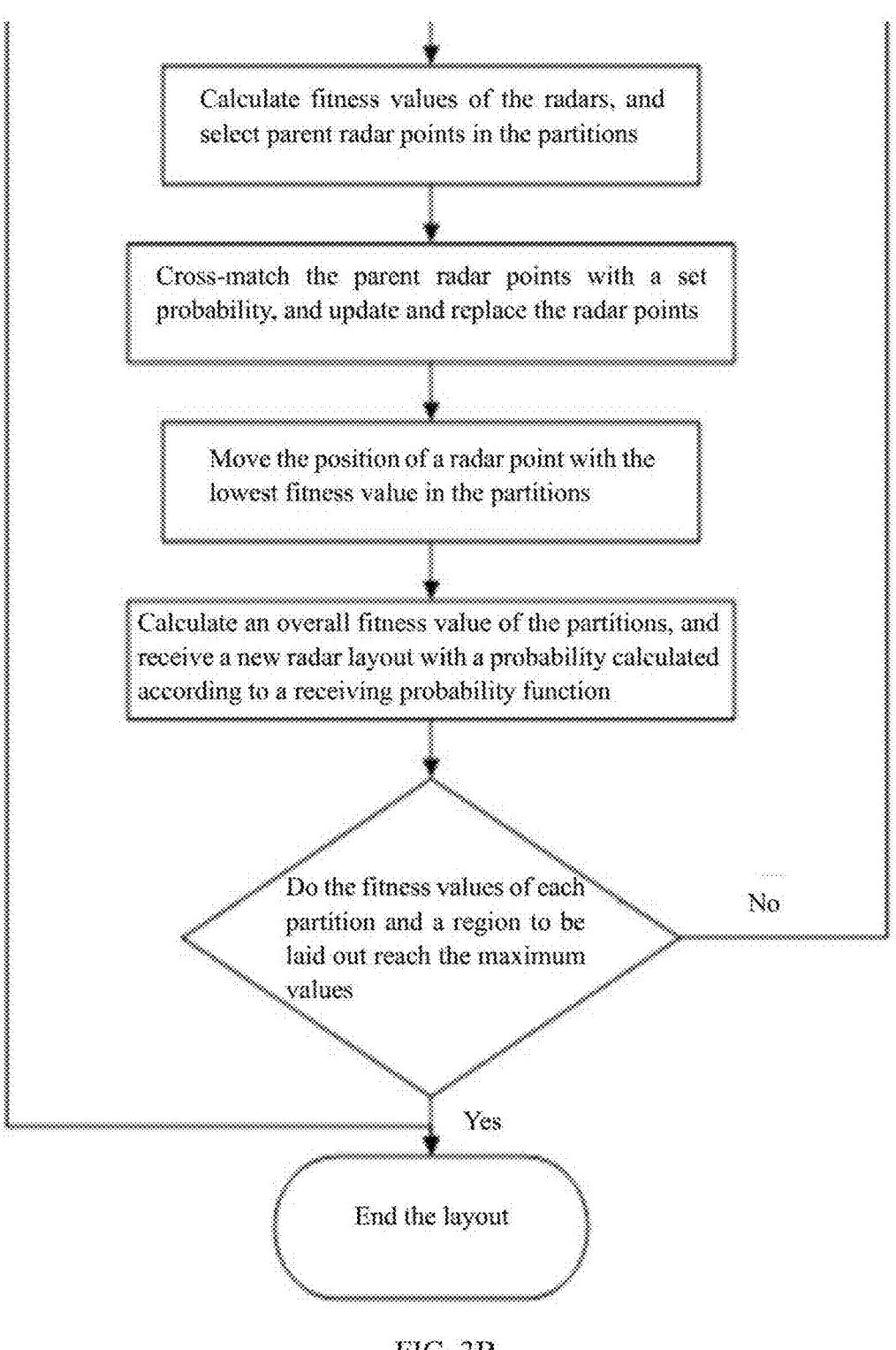

In an embodiment of the present application, as shown in FIGS. 3A and 3B, in S3, a radar layout region to be optimized is determined based on the key region of bird invasion and the radar layout evaluation value for each region.

Preferably, S3 includes the following steps S31 to S32.

In S31, a region layout evaluation function value is set.

In this embodiment, the region layout evaluation function value is preferably set as 0.95. Whether the layout optimization of this region is continued may be judged by calculating the radar layout evaluation function of each region in combination with the evaluation value for the bird invasion region. Certainly, the region layout evaluation function value is set by those skilled in the art according to their actual needs.

In S32, whether the radar layout evaluation value for each region is greater than the region layout evaluation function value is judged according to the radar layout evaluation value for each region; if yes, this region is determined not to be the key region of bird invasion, and the optimized layout of this region is ended; and if not, the radar layout continues to be optimized, that is, this region is determined to be the radar layout region to be optimized.

In an embodiment of the present application, as shown in FIGS. 3A and 3B, in S4, a fitness function of a genetic algorithm is determined based on the radar layout parameters of the radar layout region to be optimized, and genetic algorithm iteration is performed by using the fitness function until a preset optimization condition is reached, thereby obtaining optimal radar layout parameters of the radar layout region to be optimized. After this setting mode is adopted, the optimal radar layout of the region is determined in combination with a genetic algorithm, which can achieve the optimal radar layout for bird invasion detection and avoid the cases of insufficient layout coverage and repeated layout, thereby improving the efficiency and accuracy of bird invasion detection.

Preferably, S4 includes the following steps S41 to S46.

In S41, a fitness function is determined based on the radar layout parameters of the radar layout region to be optimized.

Specifically, the step S41 includes the following steps S410 to S411.

In S410, a coincidence degree of radar detection, a signal-to-noise ratio of each radar and comprehensive cost are calculated based on the radar layout parameters of the radar layout region to be optimized, where the weights occupied by the influencing factors, i.e. the coincidence degree of radar detection, the signal-to-noise ratio of each radar and the comprehensive cost, are $\omega_1$, $\omega_2$ and $\omega_3$, where $\omega_1+\omega_2+\omega_3=1$.

It should be pointed out that the radar layout parameters of the radar layout region to be optimized include the position, direction, range, signal, etc. of a radar.

In S411, a radar layout optimization model is constructed based on the coincidence degree of radar detection, the signal-to-noise ratio of each radar, and the comprehensive cost, and the radar layout optimization model is used as a fitness function of the genetic algorithm.

The radar layout optimization model max G is:

$$\max G(R, S, C) = \omega_1(-g_1(R)) + \omega_2 g_2(S) + \omega_3(-g_3(C))$$

$$g_1(R) = \frac{s'_{ij}}{s_{ij}};$$

$$g_2(S) = 10\log_{10}\frac{P_s}{P_n}$$

$$g_3(C) = nc_1 + c_2$$

and the fitness function F is:

$$F = \max G$$

in the formulae, $g_1(R)$, $g_2(S)$ and $g_3(C)$ are calculation functions for the coincidence degree of radar detection ranges, the signal-to-noise ratio of each radar and the comprehensive cost, respectively; $\omega_1$ is a weight of the coincidence degree of radar detection; $\omega_2$ is a weight of the signal-to-noise ratio of each radar; $\omega_3$ is a weight of the comprehensive cost; $S'_{ij}$ is the area of a detection range where the j-th radar in an ith region overlaps with other radars; $S_{ij}$ is a detection range of the j-th radar in the ith region; $P_s$ is a received signal power; $P_n$ is a background noise power; n is the total number of laid-out radars; $c_1$ is the cost of a single radar; and $c_2$ is the cost of others, including the cost of human resources.

In S42, the radar layout region to be optimized is partitioned to obtain a plurality of partitions to be optimized.

In S43, fitness values of all radars in each partition to be optimized are calculated by using the fitness function, and two radar points with the smallest fitness values in each partition to be optimized are selected as parents of the partition to be optimized.

In S44, a probability value is set, parent radar points of each partition to be optimized are cross-matched with the set probability to obtain new child radar points, their fitness values are calculated, and the radar point having a lower fitness value is replaced with a radar point having a higher fitness value.

The probability value set in this embodiment is 0.7. Certainly, the set probability value is selected by those skilled in the art according to their actual needs.

Preferably, cross-matching the parent radar points with the set probability to obtain new child radar points is to exchange and select position information of the parent radar points to obtain child radar points through a multi-point intersection operation with the parent radar point coverage and the corresponding directions.

In S45, an overall fitness value of each of the partitions to be optimized and a total fitness value of the radar layout region to be optimized are calculated by using the fitness function.

Preferably, a simulated annealing algorithm is also introduced to optimize the radar layout of each partition to be optimized while the overall fitness value of each of the regions to be optimized is calculated, so as to avoid local optimal layout. After the optimal radar layout of the region is determined in combination with the genetic algorithm and the simulated annealing algorithm, the radar layout of each partition to be optimized can be accurately optimized.

Specifically, S45 includes the following steps S450 to S451.

In S450, a radar point with the lowest fitness function value in the partitions to be optimized is selected, and the position of the radar is moved randomly.

In S451, an overall fitness value of the moved partitions to be optimized is calculated, a receiving probability is determined according to a receiving probability selection function, and a new radar layout is received with the receiving probability.

That is, if the region fitness value after the radar position is changed is greater than before, a change in the radar is received with a probability 1.

If the region fitness value after the radar position is changed is less than before, the change in the radar is received with a probability $$\exp\left(-\frac{F_2 - F_1}{kT}\right).$$

The probability of receiving a new radar point can be controlled by adjusting the size of T.

The calculation formula of the receiving probability selection function is:

$$P_i = \max\left(1, \exp\left(-\frac{F_2 - F_1}{kT}\right)\right)$$

where $P_i$ is the receiving probability; $F_1$ and $F_2$ represent overall fitness values of this region before and after the movement of the radar, respectively; k represent a Boltzmann constant; and T is a control parameter. The parameter values can be changed according to an optimization situation to obtain an optimal solution.

In S46, S41 to S45 are cycled until the overall fitness value of each partition to be optimized and the total fitness value of the radar layout region to be optimized reach the highest, thereby obtaining optimal radar layout parameters of the radar layout region to be optimized. That is, whether the fitness value of each region and the total region fitness value reach the highest is determined; if yes, an optimal radar layout scheme is obtained; and if not, steps S41 to S45 are continued.

The above description is preferred embodiments of the present disclosure, and it should be noted that those of ordinary skill in the art may also make several improvements and modifications without departing from the principles of the present disclosure, which should be considered as the scope of protection of the present disclosure.

What is claimed is:

1. A radar layout method applied to bird invasion detection, comprising the following steps:

S1, dividing an environment to be laid out into regions, acquiring environment parameters of each region, and setting radar layout parameters of each region;

S2, determining a key region of bird invasion by means of calculation according to the environment parameters of each region, and determining a radar layout evaluation value for each region by means of calculation according to the radar layout parameters of each region;

S3, determining, based on the key region of bird invasion and the radar layout evaluation value for each region, a radar layout region to be optimized; and S4, determining a fitness function of a genetic algorithm based on the radar layout parameters of the radar layout region to be optimized, and performing genetic algorithm iteration by using the fitness function until a preset optimization condition is reached, thereby obtaining optimal radar layout parameters of the radar layout region to be optimized.

2. The radar layout method applied to bird invasion detection of claim 1, wherein the step S4 comprises the following steps:

S41, determining the fitness function based on the radar layout parameters of the radar layout region to be optimized;

S42, partitioning the radar layout region to be optimized to obtain a plurality of partitions to be optimized;

S43, calculating, by using the fitness function, fitness values of all radars in each partition to be optimized, and selecting two radar points with the smallest fitness values in each partition to be optimized as parents of the partition to be optimized;

S44, setting a probability value, cross-matching, with the set probability, parent radar points of each partition to be optimized to obtain new child radar points, calculating their fitness values, and replacing the radar point having a lower fitness value with a radar point having a higher fitness value;

S45, calculating, by using the fitness function, an overall fitness value of each of the partitions to be optimized and a total fitness value of the radar layout region to be optimized; and S46, cycling S41 to S45 until the overall fitness value of each of the partitions to be optimized and the total fitness value of the radar layout region to be optimized reach the highest, thereby obtaining optimal radar layout parameters of the radar layout region to be optimized.

3. The radar layout method applied to bird invasion detection of claim 2, wherein the step S41 comprises the following steps:

S410, calculating a coincidence degree of radar detection, a signal-to-noise ratio of each radar and comprehensive cost based on the radar layout parameters of the radar layout region to be optimized; and S411, determining the fitness function of the genetic algorithm based on the coincidence degree of radar detection, the signal-to-noise ratio of each radar, and the comprehensive cost.

4. The radar layout method applied to bird invasion detection according to claim 1, wherein the fitness function is:

$$\max G(R, S, C) = \omega_1(-g_1(R)) + \omega_2 g_2(S) + \omega_3(-g_3(C))$$

$$g_1(R) = \frac{s'_{ij}}{s_{ij}}$$

$$g_2(S) = 10\log_{10}\frac{P_s}{P_n}$$

$$g_3(C) = nc_1 + c_2$$

wherein $g_1(R)$, $g_2(S)$ and $g_3(C)$ are calculation functions for the coincidence degree of radar detection ranges, the signal-to-noise ratio of each radar and the comprehensive cost, respectively; $\omega_1$ is a weight of the coincidence degree of radar detection; $\omega_2$ is a weight of the signal-to-noise ratio of each radar; $\omega_3$ is a weight of the comprehensive cost; $S'_{ij}$ is the area of a detection range where the j-th radar in an ith region overlaps with other radars; $S_{ij}$ is a detection range of the j-th radar in the ith region; $P_s$ is a received signal power; $P_n$ is a background noise power; n is the total number of laid-out radars; $c_1$ is the cost of a single radar; and $c_2$ is the cost of others, including the cost of human resources.

5. The radar layout method applied to bird invasion detection of claim 2, wherein the step S44 of cross-matching the parent radar points with the set probability to obtain new child radar points comprises:

exchanging and selecting position information of the parent radar points to obtain child radar points through a multi-point intersection operation with the parent radar point coverage and the corresponding directions.

6. The radar layout method applied to bird invasion detection of claim 2, wherein the step S45 further comprises the following step:

optimizing, by using a simulated annealing algorithm, radar layout of each partition to be optimized.

7. The radar layout method applied to bird invasion detection of claim 6, wherein the step of optimizing, by using a simulated annealing algorithm, radar layout of each partition to be optimized comprises the following steps:

selecting a radar point with the lowest fitness function value in the partitions to be optimized, and moving the position of the radar randomly; and calculating an overall fitness value of the moved partitions to be optimized, determining a receiving probability according to a receiving probability selection function, and receiving a new radar layout with the receiving probability.

8. The radar layout method applied to bird invasion detection of claim 7, wherein the calculation formula of the receiving probability selection function is:

$$P_i = \max\left(1, \exp\left(-\frac{F_2 - F_1}{kT}\right)\right)$$

wherein $P_i$ is the receiving probability; $F_1$ and $F_2$ represent overall fitness values of this region before and after the movement of the radar, respectively; k represents a Boltzmann constant; and T is a control parameter.

9. The radar layout method applied to bird invasion detection of claim 1, wherein the step S2 comprises the following steps:

S20, weighting influencing factors that make each region vulnerable to bird invasion to determine a key region of bird invasion; and S21, calculating a radar layout evaluation value for each region based on the radar layout parameters of each region and a ratio of an actual detection range to a theoretical detection range of the radars, wherein the influencing factors that make each region vulnerable to bird invasion include a bird distribution range, suitability of an environment, transport means and a known invasion region.

10. The radar layout method applied to bird invasion detection of claim 1, wherein the step S1 comprises the following steps:

dividing the environment into regions according to a rotating bounding box algorithm; and deploying radars at the vertices of a bounding box according to the shape of the bounding box and the maximum detection range of the radars, and deploying another radar every other vertex until the radar detection range has covered the entire regions.

*    *    *    *    *